United States Patent
Burlet et al.

(10) Patent No.: US 11,112,499 B2
(45) Date of Patent: Sep. 7, 2021

(54) SYNTHETIC ANTENNA SONAR AND METHOD FOR FORMING SYNTHETIC ANTENNA BEAMS

(71) Applicant: THALES, Courbevoie (FR)

(72) Inventors: Nicolas Burlet, Plouarzel (FR); Nicolas Mandelert, Ploudalmezeau (FR); Pierre Guthmann, Brest (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/123,406

(22) PCT Filed: Mar. 13, 2015

(86) PCT No.: PCT/EP2015/055334
§ 371 (c)(1),
(2) Date: Sep. 2, 2016

(87) PCT Pub. No.: WO2015/136089
PCT Pub. Date: Sep. 17, 2015

(65) Prior Publication Data
US 2017/0059706 A1    Mar. 2, 2017

(30) Foreign Application Priority Data
Mar. 14, 2014    (FR) ...................................... 1400614

(51) Int. Cl.
G01S 15/89    (2006.01)
G01S 7/52    (2006.01)

(52) U.S. Cl.
CPC ...... *G01S 15/8904* (2013.01); *G01S 7/52004* (2013.01)

(58) Field of Classification Search
CPC ......................... G01S 15/8904; G01S 7/52004
See application file for complete search history.

(56) References Cited

U.S. PATENT DOCUMENTS 4,244,036 A    1/1981 Raven
5,793,703 A *  8/1998 Shippey .............. G01S 15/8904
                                                    367/7

(Continued)

FOREIGN PATENT DOCUMENTS

FR    2 769 372 A1    4/1999
JP    2012-108122 A    6/2012

OTHER PUBLICATIONS

R. Bellec et al., "Repeat-track SAS interferometry: feasibility study," 2005 Proceedings of MTS/IEEE Oceans, Sep. 18, 2005, pp. 1-7, XP010921040.

*Primary Examiner* — Hovhannes Baghdasaryan
(74) *Attorney, Agent, or Firm* — BakerHostetler

(57) ABSTRACT

A synthetic aperture sonar moving along a first axis comprises an emitting device configured to emit, in each ping, at least one acoustic pulse toward an observed zone in a set of sectors comprising at least one sector. The sonar comprises a first physical receiving antenna extending along the first axis allowing measurements of backscattered signals to be acquired and a processing device configured to form, over R pings, for each sector, synthetic aperture beams from measurements of signals backscattered by the observed zone and generated by acoustic pulses emitted in the sector. The sonar comprises at least one gyrometer. The processing device is configured to correct for variations in the movement of the first receiving antenna during the formation of the synthetic aperture beams of the set of sectors by carrying out an autocalibration by intercorrelation of the successive pings.

5 Claims, 5 Drawing Sheets

(56) References Cited

U.S. PATENT DOCUMENTS

| | | | |
|---|---|---|---|
| 6,304,513 B1* | 10/2001 | Billon | ................ G01S 7/52004 367/88 |
| 2009/0175128 A1 | 7/2009 | Jean et al. | |
| 2013/0016584 A1 | 1/2013 | Zhou et al. | |
| 2014/0010048 A1 | 1/2014 | Proctor | |
| 2014/0022864 A1 | 1/2014 | Lebedev | |
| 2015/0085602 A1* | 3/2015 | Lebedev | ................ G01S 15/96 367/3 |

* cited by examiner

SYNTHETIC ANTENNA SONAR AND METHOD FOR FORMING SYNTHETIC ANTENNA BEAMS

CROSS-REFERENCE TO RELATED APPLICATIONS

This application is a National Stage of International patent application PCT/EP2015/055334, filed on Mar. 13, 2015, which claims priority to foreign French patent application No. FR 1400614, filed on Mar. 14, 2014, the disclosures of which are incorporated by reference in their entirety.

FIELD OF THE INVENTION

The present invention relates to the field of sonar imaging and to the detection and classification of objects by means of a synthetic aperture sonar. It more particularly relates to mine warfare and to the detection and classification of mines by means of a synthetic aperture sonar.

BACKGROUND

The question of classification of objects is a problem that is difficult to solve especially for bottom mines placed on a textured seabed, or for stealth mines. The use of a sonar in a very-high-resolution side-scan synthetic-aperture-sonar mode is one response to this problem, but one that remains unsatisfactory. By "side-scan sonar" what is meant is a sonar that emits acoustic pulses along a sighting axis having a bearing angle substantially equal to 90°, i.e. that is substantially perpendicular to the path of a carrier on board of which the sonar is installed. The sonar is positioned on one of the sides of a fish or carrier that is submerged. The carrier may be autonomous or towed by a surface vessel. By "very-high-resolution", what is generally meant is a resolution lower than 10 cm for a sonar having a frequency higher than 100 kHz.

The aim of synthetic aperture sonar is to improve resolution, at a given range, without increasing the linear dimension of the receiving antenna. The principle of synthetic aperture sonar consists in using a physical antenna formed by a linear array of N transducers. In this type of sonar, during the advance of the carrier, an emitting device, or emitting antenna, emits P successive pulses in an elementary sector that remains stationary with respect to the carrier. The signals received by the N transducers of the physical receiving antenna at P instants, and therefore in P successive locations, are used to form the beams of the synthetic antenna. The resolution of the images obtained, i.e. the resolution of the beams of synthetic antennae, is substantially equivalent to that of a virtual antenna the length of which corresponds to about twice the length travelled by the physical antenna during these P successive instants.

The beams of the synthetic antenna are constructed by a method for processing the backscattered signals measured by the antenna, which method is called a "synthetic aperture processing method". This type of method is known in the art. To form a beam of the synthetic antenna of the sonar, the signals measured by the receiving antenna are added using delays corresponding to the direction of the formed beam and to the various locations of the transducers of the antenna, which locations depend on the positions of the transducers in the physical antenna and on the movement of the latter.

The main difficulty experienced when applying the synthetic-antenna principle resides in the determination of the delays to be used in the beam formation. Whereas with a conventional antenna these delays depend only on the distance and direction of the sighting point, those of a synthetic antenna depend on the movement of the carrier during the formation time. The longer this formation time, i.e. the higher the number of pings, which goes hand-in-hand with a better resolution, the more difficult it is to determine these delays.

The basis of the patent application having the publication number FR 2769372 is the observation that the precision required in the measurement of the position of the receiving antenna is not obtainable with an inertial navigation system (INS) because the error in the measurement of the spatial position of a carrier equipped with an INS is too large. Moreover, in this application it is observed that, in what are called autocalibrating or autofocusing processes, which allow the position of the antenna to be obtained by processing of the various signals measured by the antenna, the precision of the angle of rotation of the antenna between two pings is the factor limiting the precision of the process. To remedy these drawbacks, it therefore proposes a method for correcting for the effects of parasitic antenna movements in a synthetic aperture sonar, i.e. for correcting for effects due to angular variations of the antenna, in which method a synthetic antenna is formed over M pings of the sonar and the variations in the movement of the physical antenna are corrected for by carrying out an autocalibration by intercorrelation of the successive pings using a measurement of the rotation of the antenna, which measurement is obtained by means of a gyrometer, and by measuring the elevation angle of the backscattered signal with an auxiliary antenna that is perpendicular to the physical antenna. This method allows the resolution of the sonar image obtained by way of the synthetic aperture beams to be substantially improved.

The method described in the patent application having the publication number FR 2769372 needs the sonar to be equipped with an auxiliary antenna that is perpendicular to the physical antenna.

SUMMARY OF THE INVENTION

One aim of the present invention is to provide a sonar that makes it possible to omit an auxiliary antenna.

To this end, one subject of the invention is a synthetic aperture sonar intended to move along a first axis, the sonar comprising an emitting device configured to emit, in each ping, at least one acoustic pulse toward an observed zone in a set of sectors comprising at least one sector, the sonar comprising a first physical receiving antenna extending along the first axis allowing measurements of backscattered signals generated by said pulse to be acquired and a processing device configured to form, over R pings, for each sector of the set of sectors, synthetic aperture beams from measurements of signals backscattered by the observed zone and generated by acoustic pulses emitted in said sector, the sonar comprising at least one gyrometer, characterized in that said processing device is configured so as to correct for variations in the movement of the first receiving antenna during the formation of the synthetic aperture beams of said set of sectors by carrying out an autocalibration by intercorrelation of the successive pings using measurements of rotation of the first receiving antenna, which measurements are obtained with said at least one gyrometer, and using estimations of the elevation angles of the backscattered signals to determine image planes of the backscattered signals and to project said rotation measurements onto said image planes, the projections obtained being used to carry out the autocalibration, and in which, during the formation of the synthetic aperture beams of at least one sector of the set of sectors, which sector is called the bathymetric sector, estimations of elevation angles of backscattered signals are used, said estimations being obtained from a bathymetric chart comprising the three-dimensional positions, defined in the terrestrial reference frame, of a plurality of points of the observed zone.

Advantageously, the emitting device is configured to emit, in each ping, in different respective sectors comprising a first sector and at least one second sector, distinguishable acoustic pulses toward an observed zone, along a first sighting axis and a second sighting axis having different bearing angles, respectively, wherein said at least one bathymetric sector comprises at least one second sector, and wherein the bathymetric chart is obtained from measurements of first elevation angles of first backscattered signals generated by acoustic pulses emitted in said first sector.

The sonar may comprise an array of transducers comprising a plurality of transducers distributed along a second axis perpendicular to the first axis, said transducers forming the array of transducers being dimensioned and configured so that their receiving lobes cover the first sector but so that said at least one second sector is located at least partially beyond their receiving lobes, the first backscattered signals being acquired by means of the array of transducers.

More precisely, the physical receiving antenna may comprise a first elementary physical antenna formed from first transducers dimensioned and configured so that their receiving lobes cover the first sector but so that said at least one second sector is at least partially located beyond their receiving lobes. The sonar comprises a second elementary physical antenna formed from second transducers dimensioned and configured so that their receiving lobes cover the first and second sectors. The processing device is configured so as to form, during the formation of the synthetic aperture beams, beams of a first synthetic antenna from measurements of first backscattered signals generated in the first sector and acquired by means of the first elementary antenna, and beams of a second synthetic antenna from measurements of second backscattered signals generated by pulses emitted in said second sector and acquired by means of the second elementary antenna.

Advantageously, the array of transducers is formed by the first elementary antenna and another antenna that is identical to the first elementary antenna and superposed on the first elementary physical antenna along the second axis.

Advantageously, the bathymetric chart is stored in a memory of the sonar before the observed zone is imaged.

Another subject of the invention is a sonar system comprising the sonar of the invention, and a carrier, the sonar being installed in the carrier.

Another subject of the invention is a method for forming synthetic aperture beams of a sonar over R pings of the sonar, the sonar being intended to move along a first axis, the sonar comprising an emitting device configured to emit, in each ping, at least one acoustic pulse toward an observed zone in a set of sectors comprising at least one sector, the sonar comprising a first physical receiving antenna extending along the first axis allowing measurements of backscattered signals generated by said at least one pulse to be acquired and a processing device configured to form, over R pings, for each sector of the set of sectors, synthetic aperture beams from measurements of signals backscattered by the observed zone and generated by acoustic pulses emitted in said sector, the sonar comprising at least one gyrometer, the method comprising a forming step in which, for each sector over R pings, synthetic aperture beams are formed from measurements of signals backscattered by the observed zone and generated by acoustic pulses emitted in said sector, in which variations in the movement of the first receiving antenna during the formation of the synthetic aperture beams of said set of sectors are corrected for by carrying out an autocalibration by intercorrelation of the successive pings using measurements of rotation of the first receiving antenna, which measurements are obtained with said at least one gyrometer, and using estimations of the elevation angles of the backscattered signals to determine image planes of the backscattered signals and to project said rotation measurements onto said image planes, the projections obtained being used to carry out the autocalibration, and in which, during the formation of the synthetic aperture beams of at least one sector of the set of sectors, which sector is called the bathymetric sector, estimations of elevation angles of backscattered signals are used, said estimations being obtained from a bathymetric chart comprising the three-dimensional position of a plurality of points of the observed zone.

Advantageously, the emitting device is configured to emit, in each ping, in different respective sectors comprising a first sector and at least one second sector, distinguishable acoustic pulses toward an observed zone, along a first sighting axis and a second sighting axis having different bearing angles, respectively. Said at least one bathymetric sector comprises at least one second sector. The bathymetric chart is obtained from measurements of first elevation angles of first backscattered signals generated by acoustic pulses emitted in said first sector.

Advantageously, the sonar comprises an array of transducers comprising a plurality of elementary transducers distributed along a second axis perpendicular to the first axis, said transducers forming the array of transducers being dimensioned and configured so that their receiving lobes cover the first sector but so that said at least one second sector is located at least partially beyond their receiving lobes, the first backscattered signals being acquired by means of the array of transducers, the method advantageously comprising, for each ping, a step of measuring first elevation angles of first backscattered signals by means of the array of transducers, a step of calculating estimations of first elevation angles, consisting in transposing the measurements of first elevation angles to a terrestrial reference frame. The method furthermore comprises a step of producing the bathymetric chart from the estimations of the first elevation angles, the bathymetric chart comprising three-dimensional coordinates, in the terrestrial reference frame, of probe points having backscattered the first backscattered signals.

Advantageously, the method comprises a step of estimating, from the bathymetric chart, the elevation angles of the backscattered signals generated by pulses emitted in said bathymetric sector. The method comprises, for each of the backscattered signals, a step of calculating the position of that point Mp of the bathymetric chart which is closest to a section of a circle Cp obtained by rotating, about the first axis, a point B located on the other sighting axis at a distance from the antenna corresponding to the distance separating the antenna from a probe point having generated the backscattered signal, a step of calculating a first point of intersection Ip between the bathymetric chart and the section of the circle Cp on the basis of the closest point Mp, and a first step of calculating, in the terrestrial reference frame, the elevation angle of the point of intersection.

The point of intersection Ip may be the point of intersection between a horizontal plane, in the terrestrial reference frame, passing through the closest point Mp, and the section of the circle Cp.

Advantageously, the method comprises a second step of calculating a second point of intersection Ip between the bathymetric chart and the section of the circle Cp on the basis of the closest point Mp and other points of the bathymetric chart, and, if a second point of intersection is obtained, a second step of calculating the elevation angle of the second point of intersection.

The physical receiving antenna may comprise a first elementary physical antenna formed from first transducers dimensioned and configured so that their receiving lobes cover the first sector but so that said at least one second sector is at least partially located beyond their receiving lobes. The step of forming beams then comprises a step of forming beams of a first synthetic antenna from measurements of backscattered signals generated by pulses emitted in said first sector and acquired by means of the first elementary antenna, in which step the estimations of backscattered signal elevation angles used to determine the image planes of the backscattered signals and to project said rotation measurements onto said image planes are estimations of first elevation angles of the first backscattered signals, the first backscattered signals being generated by pulses emitted in said first sector, the estimations of the first elevation angles being transpositions of the measurements of the first elevation angles into the terrestrial reference frame.

The last subject of the invention is a computer program product comprising programming code instructions for executing the steps of the method according to the invention when the program is run on a computer.

The proposed invention makes it possible to omit the auxiliary antenna. It also makes it possible not to decrease the resolution of the synthetic aperture sonar, i.e. without decreasing its detection and classification capabilities. In other words, the obtained resolution is comparable to that obtained by means of the method described in document FR 2769372, i.e. to the resolution obtained by means of a method using an autofocusing process in which the parasitic movements of the antenna are corrected for.

BRIEF DESCRIPTION OF THE DRAWINGS

Other features and advantages of the invention will become apparent on reading the following detailed description, which is given by way of nonlimiting example and with reference to the appended drawings, in which.

From one figure to the next, the same elements have been referenced by the same references.

DETAILED DESCRIPTION

The invention relates to a mono-aspect or multi-aspect synthetic aperture sonar. By "mono-aspect synthetic aperture sonar", what is meant is a synthetic aperture sonar intended to move along a first axis, the sonar comprising an emitting device configured to emit, in each ping, an acoustic pulse toward an observed zone in a single sector, the sonar comprising a first physical receiving antenna allowing measurements of backscattered signals generated by said pulse to be acquired and a processing device configured to form, over R pings, synthetic aperture beams from measurements of signals backscattered by the observed zone, which signals are generated by acoustic pulses emitted in said sector. The acoustic pulses are emitted along a single sighting axis in a single sector surrounding the sighting axis. This sighting axis may be attached to the antenna or be directed in a fixed direction in the terrestrial reference frame, for example by means of a stabilizing device. By "sector in which an acoustic pulse is emitted", what is meant is the sector of −3 dB aperture in which the main lobe of the emitted acoustic pulse is emitted.

The performance of a mono-aspect synthetic aperture sonar proves to be unsatisfactory in the step of classifying objects detected in sonar images. By "classifying", what is meant is the characterization of the nature of the object detected in the image (such as for example its size and/or its shape or even the characterization of the object as a mine or not a mine). In order to improve classification performance, the viewpoints of the detected objects are multiplied. The greater the number of observations of a given object at different angles, the easier it is to classify this object. To multiply viewpoints, one solution consists in using a multi-aspect synthetic aperture sonar. This solution does not require the sonar to be passed over the observation area a plurality of times along different paths. It moreover has a low power consumption. Therefore, this solution is suitable for installation on autonomous submarine vessels. It does not require the absolute position of the carrier to be known with high precision or registration techniques to be implemented in order to associate various views of a given object together. It furthermore makes it possible to improve the rate of detection of objects in sonar images.

Figure 1:
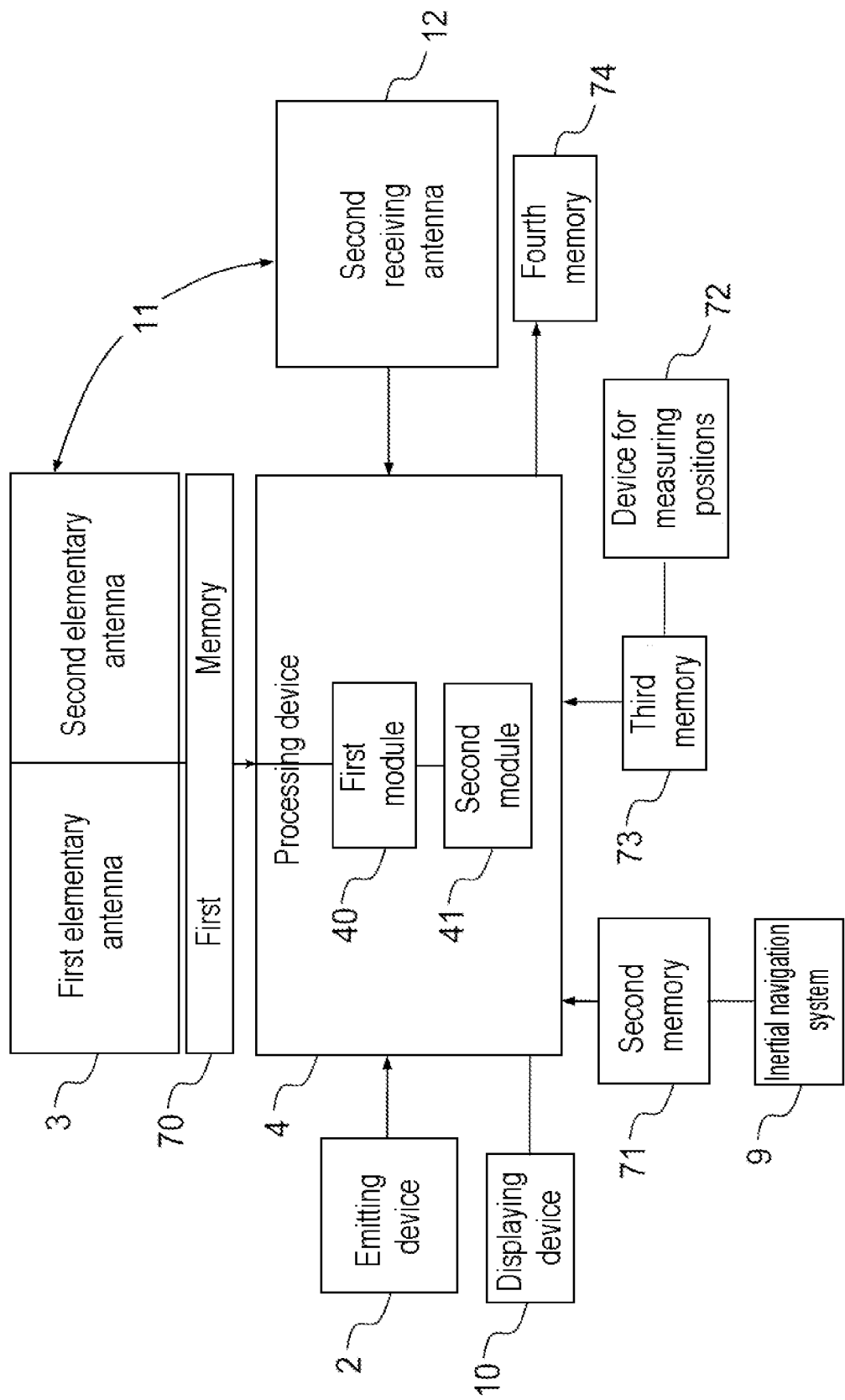
FIG. 1 schematically shows the components of an exemplary sonar according to the invention.

FIG. 1 shows the constituent components of an exemplary sonar 1 according to the invention. In this example, the sonar is a multi-aspect sonar. It comprises an emitting device 2, comprising one or more emitting antennae. The emitting device 2 is configured so as to emit, in each ping, acoustic pulses toward an observed zone, for example a seabed. The pulses emitted in one ping are emitted in a set of sectors comprising a plurality of sectors. In each ping, the emissions emitted in the respective sectors are distinguishable. For example, the pulses emitted in the respective sectors are emitted with carriers that are distinct from one another, i.e. located in separate frequency bands. As a variant, the pulses are emitted with carriers having one and the same carrier frequency but are distinguished from one another by orthogonal codes, i.e. by orthogonal modulations. The signals backscattered by the seabed and originating from the various sectors are then distinguishable in the same way as the pulses emitted in these various sectors, for example by filtering or by demultiplexing. In each ping, the pulses emitted in the various sectors are, for example, emitted simultaneously or substantially simultaneously.

Figure 2:
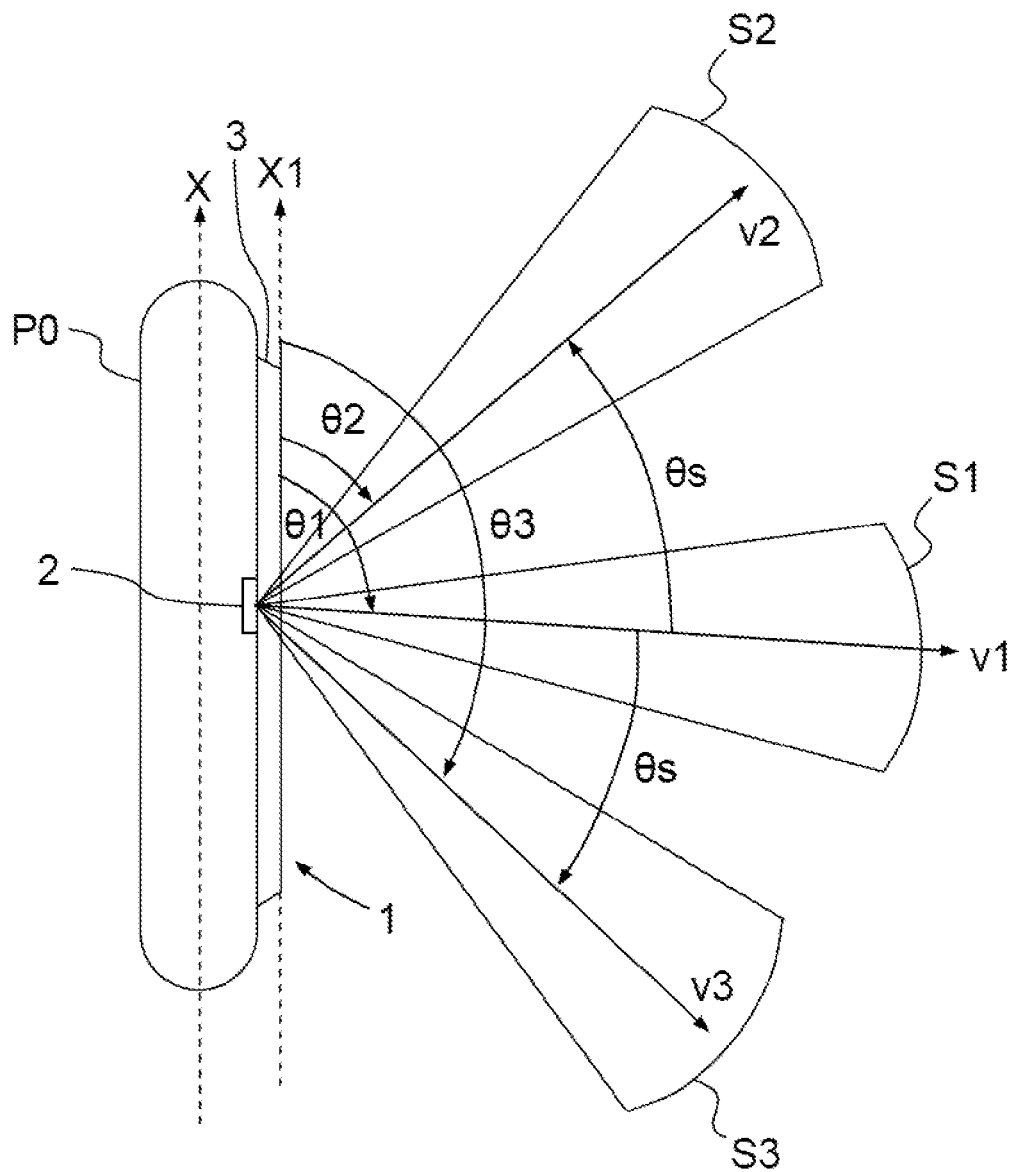
FIG. 2 schematically shows the sonar in FIG. 1 installed on a carrier as seen from above during the emission of acoustic pulses in three sectors.

FIG. 2 shows the sectors S1, S2 and S3 in which the emitting device 2 of the sonar according to the invention emits the acoustic pulses in each ping. The emitting device 2 emits 3 pulses in three respective sectors S1, S2, S3 in each ping along the respective sighting axes v1, v2, v3. The sonar 1 is intended to move along a first axis X1 during the emission of the acoustic pulses in the successive pings. The sonar 1 is mounted on a carrier PO. In the embodiment in the figure, the first axis X1 is parallel to the direction X of movement of the carrier PO. The sighting axes v1, v2, v3 make different respective bearing angles θ1, θ2, θ3 to the first axis X1. Advantageously, the sighting axes v1, v2, v3 have the same elevation angle, the elevation angle being defined in the terrestrial reference frame. As a variant, the sighting axes have the same what is called local elevation angle in the reference frame associated with the sonar, i.e. they make the same angle to a plane parallel to the axis X1 and perpendicular to the plane formed by the active areas of the transducers.

The sighting axes v1, v2, v3 comprise a lateral sighting axis v1 that is substantially perpendicular to the first axis X1, and two additional sighting axes v2 and v3 that are symmetric with one another about a plane of symmetry that is perpendicular to the direction of advance X and that passes through the axis v1. In other words, the bearing angle θ1 of the axis v1 is equal to 90°. It will be called the lateral sighting axis below. The axes v2 and v3 for example make bearing angles θs to the axis v1 of −35° and 35°, respectively. As a variant, the additional sighting axes are not symmetric with one another about the plane of symmetry. The axis v2 is called the forward sighting axis and the sighting axis v3 is called the rearward sighting axis. The swing-off of the sighting axes v2 and v3 with respect to the first axis v1 is achieved electronically or mechanically. In the latter case, the emitting device comprises three emitting antennae steered along three different sighting axes.

In the embodiment in FIG. 2, the sectors S1, S2, S3 do not adjoin. The apertures of two adjacent sectors are smaller than the angle made between them in the reference plane. Advantageously, the angular aperture of each sector is small, i.e. smaller than 10°. These characteristics make it possible to limit backscattered-signal processing cost by limiting the total size of the insonified sector while maximizing the total effective clockwise coverage of the sonar. Generally, the aperture of the sectors must be sufficiently large to obtain the desired resolution at the emission frequency of the sonar. Limiting the width of the insonified sector makes it possible to limit the elevation between the hydrophones of the first receiving antenna and therefore their number and cost. As a variant, the sectors adjoin or partially overlap pairwise. The sectors S1 to S3 for example have the same bearingwise aperture and the same elevationwise aperture. As a variant, the sectors have different bearingwise and/or elevationwise apertures.

The number of sectors is as a variant different from 3 and for example equal to 5 or to 2. What is important is that, in each ping, the emitting device 2 emits distinguishable acoustic pulses in respective sectors comprising at least one first sector and another sector distinct from the first sector.

The sonar 1 comprises a first physical receiving antenna 3 allowing the signals backscattered by the seabed and generated by the acoustic pulses emitted in the various sectors in each ping to be measured. The sonar 1 also comprises a processing device 4, for example comprising at least one computer, configured so as to form the beams of a synthetic antenna for each of the sectors. In other words, the processing device 4 is configured so as to form synthetic aperture beams, this consisting in forming, for each sector, the beams of a synthetic antenna from measurements of backscattered signals generated by acoustic pulses emitted in the sector in question, i.e. from measurements of signals backscattered by the observed zone in the sector in question. The processing device 4 is configured to form, over R pings, the beams of a first synthetic antenna from measurements of backscattered signals generated by acoustic pulses emitted in the first sector S1, and the beams of at least one other synthetic antenna, the beams of each other synthetic antenna being formed from measurements of backscattered signals generated by acoustic pulses emitted in one of the other sectors. The measurements of backscattered signals used are measurements carried out by the first receiving antenna 3. In the case shown in FIG. 2, the processing device 4 therefore forms the beams of three synthetic antennae, one for each of the sectors S1, S2, S3.

In FIG. 2, the first receiving antenna 3 is placed on the starboard side, the emitting device 2 emitting acoustic pulses on the starboard side. As a variant, the sonar comprises two emitting devices, one emitting port-side and one emitting starboard-side, and two receiving antennae, one port-side and one starboard-side.

The first receiving antenna 3 is a longitudinal antenna extending linearly along a first axis X1. The first axis X1 is substantially parallel to the direction X of advance of the carrier PO. The receiving antenna comprises N+M sensors. It comprises, generally, one or more elementary physical receiving antennae.

Figure 3:
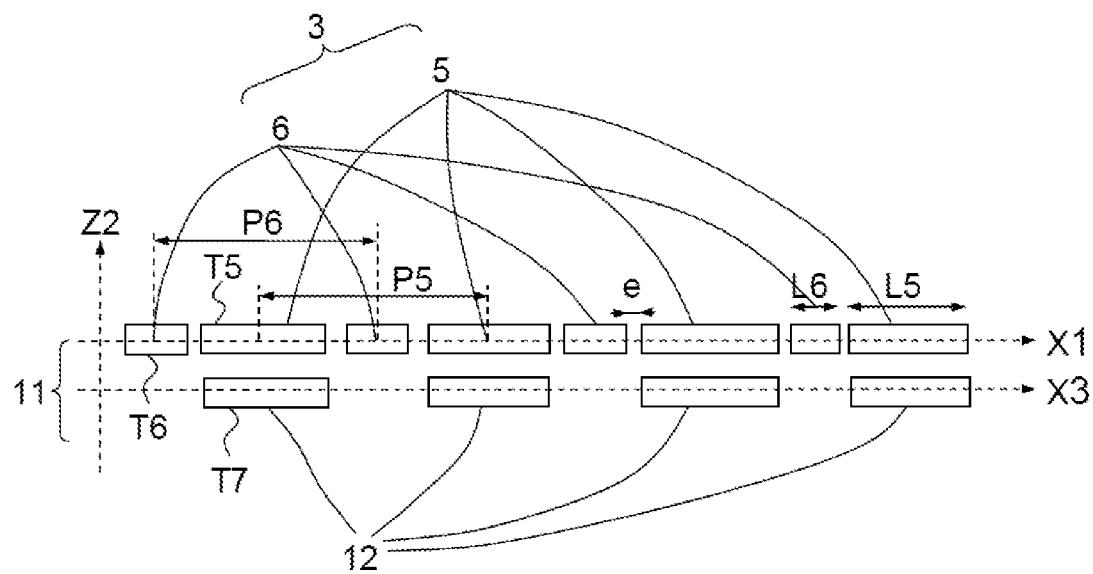
FIG. 3 schematically shows, from the side, the first physical receiving antenna and a second receiving antenna of the sonar in FIG. 1.

FIG. 3 shows a side view of the receiving antennae of the sonar according to the invention. The first receiving antenna 3 is a composite antenna formed from a linear array of N+M transducers. It comprises a first elementary antenna 5 that comprises a linear array of M (here 4) identical first transducers T5 spaced apart along the first axis X1, and a second elementary antenna 6 comprising a linear array of N (here 4) identical second transducers T6 spaced apart along the first axis X1. The first transducers T5 are separated pairwise by a second transducer T6 along the first axis X1 and the second transducers T6 are separated pairwise by a first transducer T5 along the axis X1. In other words, the linear array of N+M transducers along the axis X1 comprises, in alternation, along the first axis X1, a first transducer and then a second transducer. Consecutive transducers are separated by a space having a set length e along the first axis so that the first elevation P5 between the first transducers is equal to the second elevation P6 between the second transducers.

In the embodiment in FIG. 3, the first transducers T5 have a larger width L5 than the width L6 of the second transducers T6 along the first axis X1. Therefore, the bearingwise aperture of the receiving lobes of the first transducers T5 of the first elementary antenna 5 is smaller than the bearingwise aperture of the receiving lobes of the second transducers T6 of the second elementary antenna 6. Advantageously, the first transducers T5 are dimensioned and configured so that only the first sector S1 is included in their receiving lobes and so that the other sectors S2, S3 are located outside of the receiving lobes of the first transducers T5 forming the first elementary antenna 5. In other words, the first transducers have a directivity that allows the first antenna 5 to image the first sector S1 but that does not allow the other sectors to be imaged simultaneously. In contrast, the signal-to-noise ratio of the first elementary antenna is higher than the signal-to-noise ratio of the second antenna. The bearingwise aperture of the transducers of the first elementary antenna 5 is advantageously substantially equal to the bearingwise aperture of the first sector S1. As a variant, the first transducers T5 are dimensioned and configured so that the first sector is included in the receiving lobes of the first transducers T5 of the first elementary antenna 5 and so that the other sectors S2, S3 are at least partially included in the receiving lobes of the first transducers T5 of the first elementary antenna. This variant generates a synthetic first antenna having a worse signal-to-noise ratio but a lower cost.

The elementary antennae 5, 6 each allow the backscattered signals generated by all the pulses emitted in one ping by the emitting device 2 to be measured. The processing device 4 is configured so as to distinguish the measurements of signals backscattered by the seabed and originating from the respective pulses and to generate the beams of three synthetic antennae. The processing device 4 comprises a first module 40 allowing the measurements of backscattered signals to be distinguished depending on the acoustic-pulse sector in which they were generated, i.e. the sector in which the target that backscattered the signal is found, and a second module 41 allowing the beams of the synthetic antennae to be generated from measurements of the signals backscattered in the respective sectors. The second module 41 is configured so as to generate the beams of the first synthetic antenna from first measurements of first signals backscattered by the observed zone and generated by pulses emitted in the first sector S1, said first measurements being acquired by the first elementary antenna 5. The second module 41 is configured so as to generate the beams of the second and third synthetic antennae from second measurements of signals backscattered by the seabed and generated by pulses emitted in the second and third sectors S2 and S3, the second measurements being acquired by the second elementary antenna 6. This arrangement and the associated processing mode make it possible to obtain a first synthetic antenna of high resolution and having a very good signal-to-noise ratio and other synthetic antennae having a very high resolution, without having to excessively sample the receiving antenna, i.e. without having to provide an inter-transducer elevation with a value of about half the wavelength of the acoustic pulse used. This makes it possible to limit the required number of transducers, this having advantages in terms of cost and power consumption.

The processing device 4 also allows an image representing the synthetic aperture beams of each synthetic antenna to be generated. These synthetic images are, for example, but not necessarily, waterfall type images. They represent the beams of the synthetic antennae over R pings, and in the R+1th ping the ping of index 1 disappears from the screen in order to allow the representation of the R+1th ping to appear. These images are not focused on a particular point in the geocentric reference frame. They thus have the advantage of allowing objects to be detected and not solely a previously detected object to be classified. They represent a number of viewpoints of an observed zone equal to the number of sectors, the viewpoints being acquired substantially simultaneously. The sonar 1 according to the invention comprises a displaying device 10 allowing said synthetic images to be displayed simultaneously. It allows an operator to simultaneously observe various synchronized viewpoints of an observed zone, thereby making object detection and classification operations easier for him.

The modules are for example computational functions of a given computer or different computers. The first module may comprise filters and/or a demultiplexer.

As for mono-aspect sonars, the resolution of the synthetic antennae of a multi-aspect sonar is limited by deviations of the receiving antenna from a rectilinear and uniform navigational path. Therefore, the formation of the beams of each of the synthetic antennae is carried out while correcting for the effects of parasitic movements of the receiving antenna 3 using the correcting principal described in patent application FR 2769372. The processing device 4 is configured so that variations in the movement of the first physical receiving antenna 3 are corrected for, for each synthetic antenna, by performing an autocalibration by intercorrelation of the successive pings using measurements of rotations of the receiving antenna between successive pings, said measurements being obtained by means of at least one gyrometer 9, and using estimations, in the terrestrial reference frame, of the elevation angles of signals backscattered between these two pings. Each gyrometer for example forms part of an inertial navigation system 9. The gyrometers together advantageously form an inertial navigation system.

Figure 4:
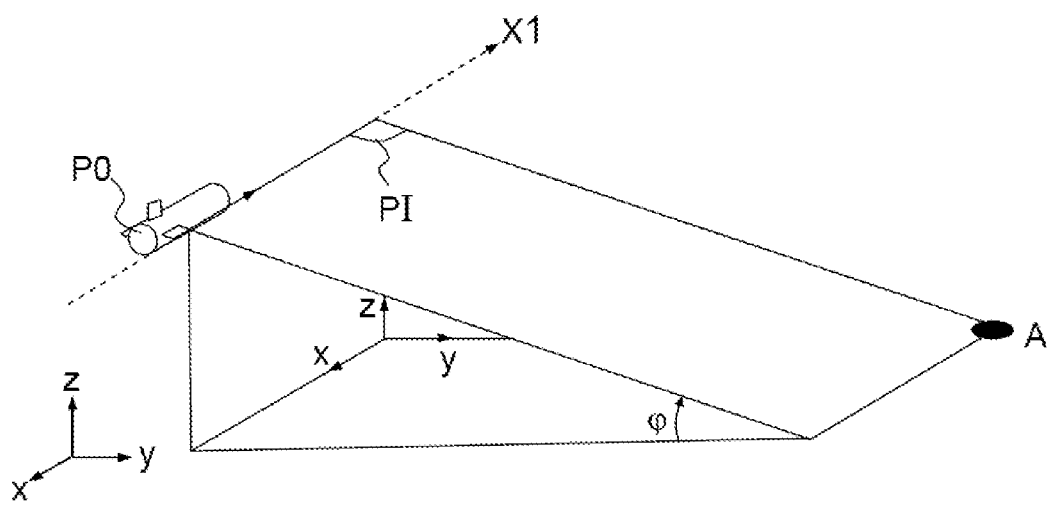
FIG. 4 schematically shows an elevation angle of a signal backscattered by a target A, such as calculated and used in the method according to invention.

FIG. 4 shows a terrestrial reference frame x, y, z, representing the vertical direction in the terrestrial reference frame and the plane (x,y) a horizontal plane in the same reference frame. The elevation angle φ i.e. the elevation angle defined in a terrestrial reference frame, of a signal backscattered by a target A is, in the present patent application, the angle made between the image plane PI, which is the plane containing the target A and the first axis X1, and the horizontal plane (x,y). The elevation angles or elevationwise inclinations of the backscattered signals correspond to the elevation angles of the image planes or sighting planes of the antenna, which planes are defined for the sighting points having generated these backscattered signals.

In the sonar according to the invention, in each ping, estimations of the elevation angles of backscattered signals are used to define the image planes of the backscattered signals and to project the rotation measurements obtained by means of the gyrometers onto the obtained image planes, as is described in patent application FR 2769372. Next, on the basis of the projections of the obtained rotation measurements, parameters I and τ are estimated for each synthetic antenna by a conventional autocalibrating process, τ being the difference in the round-trip propagation time of the sonar pulse for a given point of reflection in the observed zone (here the seabed) between two successive pings, and I being the longitudinal movement of the receiving antenna, along the first axis X1, between two successive pings. These parameters make it possible to correct for variations in the movement of the physical antenna during the formation of the beams of the synthetic antennae. The same process is used in the case of mono-aspect sonars.

By "autocalibrating process", what is meant is a process that determines these coefficients from measurements of backscattered signals acquired by the receiving antenna. Among such processes, processes exploiting the intercorrelation of the acoustic field over the antenna over two successive pings are in particular known. When the longitudinal movement between two pings is smaller than half the length of the receiving antenna, the field at the front end of the first ping is highly correlated with the field at the back end. The length Lc of the two correlated ends of the field of the antenna is then given by the formula: Lc=L−2·V·Tr. Such a process exploits this correlation to estimate the longitudinal movement I, the difference τ in the round-trip propagation time of the sonar pulse for a given point of reflection from the seabed, and the rotation β of the sighting direction, between the two pings. One example of such a method is described in U.S. Pat. No. 4,244,036 (Raven).

The use of the elevation angles of the backscattered signals to form the beams of the various synthetic antennae thus allows synthetic aperture beams and synthetic images having a very high resolution to be obtained.

In summary, the estimations of the elevation angles of the backscattered signals are used in order to project the rotation measurements obtained by the gyrometer(s) onto the image planes of the backscattered signals, the projections obtained being used to carry out the autocalibration. The projections of the rotation measurements onto the image planes are the only data required to generate the autocalibrated synthetic antennae. The use of projections of the rotation measurements onto the image planes allows synthetic aperture beams having a better resolution to be obtained than when the rotation measurements obtained by means of gyrometers are used. This method makes it possible to improve the resolution of the sonar image obtained from the synthetic aperture beams. The elevation angles are defined in the terrestrial reference frame.

According to the invention, during the formation of the synthetic aperture beams of at least one sector of the set of sectors, which sector is called the bathymetric sector, estimations of elevation angles of backscattered signals are used, which estimations are taken from among said elevation-angle estimations used during the formation of beams of at least one of the synthetic antennae. These estimations are obtained from a bathymetric chart comprising three-dimensional positions defined in the terrestrial reference frame of respective points of the observed zone.

According to the invention, it is for example possible to make provision for all the insonified sectors to be bathymetric sectors or indeed for the only insonified sector (mono-aspect case) to be a bathymetric sector.

The invention has the advantage of allowing an auxiliary antenna, such as described in patent application FR 2769372, comprising a plurality of sensors distributed along an axis perpendicular to the axis of the first receiving antenna, to be omitted. It is for example possible to use a pre-existing bathymetric chart of the observed zone, which chart is stored in a memory of the sonar before the observed zone is imaged. This bathymetric chart may be obtained from an atlas of bathymetric charts or by a survey by a hydrographic ship. As a variant, the bathymetric chart may be obtained by means of a multibeam probe or of another side-scan sonar, for example, without a bathymetric capability, or by means of a device for measuring the altitude of the sonar, assuming that the observed zone has a constant altitude. In the latter three cases, the bathymetric chart may be constructed during R pings of the sonar or before the R pings. In summary, the bathymetric chart may be obtained by means of a system external to the sonar according to the invention. Advantageously, the sonar is devoid of an auxiliary antenna comprising a plurality of sensors distributed along an axis perpendicular to the axis of the first receiving antenna. Such a sonar has both a low hardware cost and a low processing cost, a low bulk, a low weight, and consumes little power because of the decrease in the processing cost and of the decrease in bulk and weight.

As a variant, the sonar according to the invention comprises an auxiliary antenna such as described in patent application FR 2769372.

According to one particular embodiment relating to the multi-aspect sonar such as described above, elevation-angle estimations obtained from the bathymetric chart are used to correct for variations in the movement of the first receiving antenna during the formation of the beams of sectors S2 and S3 or of at least one of these two sectors.

The bathymetric chart may be constructed by various means, for example by means of a device external to the sonar.

Advantageously, the measurements of first elevation angles used to estimate the elevation angles are measurements of the first elevation angles of the backscattered signals originating from the first sector, i.e. generated by acoustic pulses emitted in the first sector. Estimating the elevation angles of the backscattered signals generated by pulses emitted in the sectors S2 and S3 on the basis of first elevation angles measured for backscattered signals generated by acoustic pulses emitted in the first sector allows synthetic images having a much better resolution to be obtained for these sectors S2, S3 without needing to correct for the parasitic movements of the receiving antenna during the formation of the beams of the synthetic antennae corresponding to these sectors, these images being similar to those that would have been obtained if elevation-angle measurements obtained directly by an auxiliary antenna having a receiving lobe covering these sectors were used.

According to one particular embodiment, the bathymetric chart is obtained from measurements of first elevation angles of first backscattered signals acquired in the first sector S1. The measurements of the first elevation angles are obtained by means of measurements of backscattered signals obtained by means of an array 11 of transducers T5, T7 comprising a plurality of transducers distributed along a second axis Z2 perpendicular to the first physical receiving antenna 3, i.e. perpendicular to the first axis X1. In other words, the array 11 comprises a stack of transducers in the direction Z2. Such a distribution of transducers makes it possible to take measurements of first elevation angles of backscattered signals since the array 11 of transducers has a directivity along the axis Z2. The signal-to-noise ratio of the elevation-angle measurements performed by this antenna is clearly higher than that obtained with the receiving antenna 3. The axis Z2 is perpendicular to the first axis X1 and is parallel, locally, to the plane of the first physical antenna, i.e. to the plane formed by the membranes of the transducers 5, 6. The axis Z2 is parallel to the vertical axis z defined in a terrestrial reference frame, when the angle of elevation of the receiving antenna 3 is zero. Preferably, the array 11 has, along the axis Z2, a height larger than the height of the first receiving antenna 3.

Advantageously, the transducers T5, T7 forming the array 11 of transducers are dimensioned and configured so that only the first sector S1 is completely comprised in their receiving lobes. We will see that this makes it possible to limit the required number of sensors, and therefore the cost of the sonar, while allowing synthetic images and synthetic aperture beams of very high resolution to be obtained.

By "configuration of the transducers", what is meant is their positions with respect to the receiving antenna and their boresight directions. In other words, the transducers of the array 11 of transducers are dimensioned and configured so that the first sector S1 is comprised, bearingwise, in their main receiving lobes and so that the other sectors S2, S3 are at least partially located, bearingwise, outside of their main receiving lobes. Advantageously, the bearingwise aperture of the receiving lobes of the transducers of the array 11 is substantially equal to the bearingwise aperture of the first sector S1.

In the embodiment in FIG. 3, the other sectors S2, S3 are located completely outside the main lobes of the transducers forming the array 11 of transducers. In this figure, the sonar 1 according to the invention comprises a second receiving antenna 12. This second receiving antenna 12 is a physical antenna identical to the first elementary antenna 5 and superposed on the first elementary antenna 5 along the second axis Z2. It comprises third transducers T7 distributed along a third axis X3 parallel to the first axis X1. The third transducers T7 are identical to the transducers T5 and spaced apart by the same elevation along the axis X1. The array 11 of transducers by means of which the first elevation angles are measured comprises the transducers of the first elementary antenna 5 and of the second elementary antenna 12. In other words, the array 11 of transducers is formed by the first elementary receiving antenna 5 and by the second receiving antenna 12. These two antennae form an interferometric antenna.

As a variant, the second receiving antenna 12 is shorter, along the axis X1, then the first receiving antenna. In other words, it comprises fewer sensors along the axis X1. In another variant, the second receiving antenna 12 comprises transducers having a different size, in the direction X1 and/or in the direction Z2, than the first transducers T5.

In another variant, the array 11 of transducers comprises only one transducer in the direction X1 and a linear array of spaced-apart transducers along the axis Z2. The array of transducers optionally comprises one of the transducers of the first receiving antenna 3. However, these antennae are not selective bearingwise, and only allow synthetic aperture beams of lower bearingwise resolution to be obtained.

The transducers forming the array 11 may extend linearly along the second axis Z2 or indeed form a curved surface following the curvature of the cylindrical hull but having an extension along the second axis Z2.

In summary, the transducers forming the array 11 of transducers are configured and dimensioned so that the array 11 allows the elevation angles of signals backscattered by targets located in only one and not all of the sectors S1, S2, S3 to be estimated directly. In the nonlimiting example of this patent application, this sector is the sector S1, i.e. the side-scan sector. This solution is economical from a software point of view and from a hardware point of view since it does not require provision to be made for an array of transducers allowing all the sectors to be covered. It is for example more economical than a solution consisting in forming an interferometric antenna from the first receiving antenna and a second identical receiving antenna superposed on the first receiving antenna in the direction Z2. The number of transducers of the second receiving antenna would then be twice the number of transducers of the second receiving antenna of the sonar according to the invention, and this would be more expensive from a hardware point of view and from the point of view of data processing, and would increase bulk. In contrast, the proposed solution based on the interferometric-antenna array 11 according to the invention allows elevation angles to be obtained, in the first sector S1, with a resolution identical to that of an interferometric antenna obtained by superposing a first receiving antenna 3 and another identical antenna. The proposed solution does not require an interferometric antenna that is costly and oversampled along the axis X1.

Figure 5:
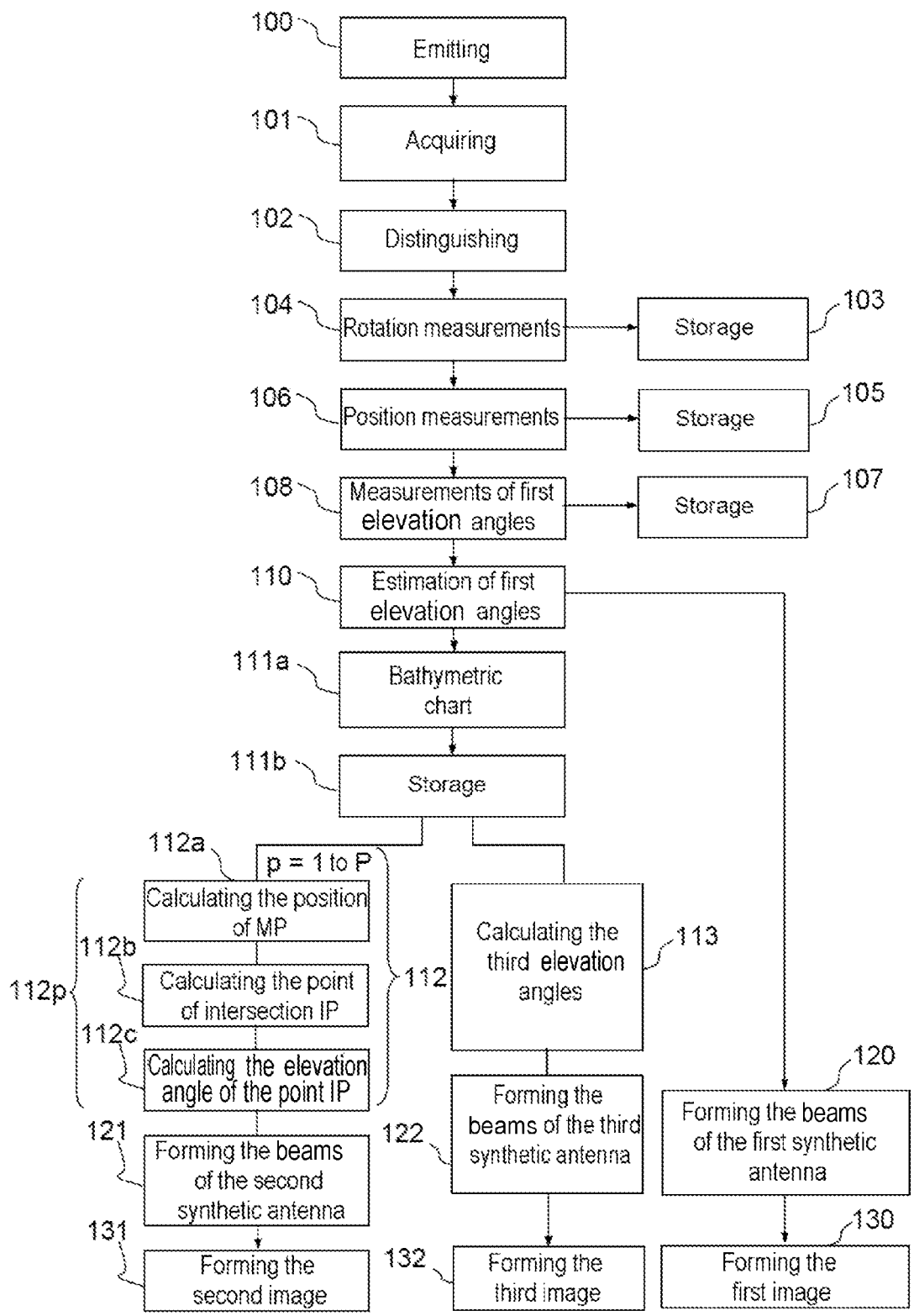
FIG. 5 shows a block diagram of an exemplary method according to invention.

The invention also relates to a method for forming a synthetic antenna of a sonar according to the invention over R pings of the sonar. The sonar described above is able to implement the method according to the invention. FIG. 5 shows a block diagram of this method.

The beams are formed from the measurement signals obtained from R pings.

The method comprises, in each ping r where r=1 to R,
- a step 100 of the emitting distinguishable acoustic pulses in each sector S1, S2, S3, by means of the emitting device 2, as the sonar 1 advances along the axis X1;
- a step 101 of acquiring measurements of signals backscattered by the observed zone, by means of the first receiving antenna 3;
- a step 102 of distinguishing between the measurements of the signals acquired by the first receiving antenna, for example by means of the first module 40, possibly carried out after step 103;
- a step 103 of storing the measurements of the signals acquired by the first receiving antenna 3, for example in a first memory 70;
- a step 104 of measuring (roll, pitch and yaw) rotations of the first receiving antenna or of the carrier PO by means of at least one gyrometer;
- a step 105 of storing the rotation measurements, for example in a second memory 71, which may optionally be the first memory;
- a step 106 of measuring the position of the carrier, or of the receiving antenna 3, in a terrestrial reference frame by means of a device 72 for measuring position. This step allows the position of the carrier PO in latitude, longitude and depth to be measured in a terrestrial reference frame;
- a step 107 of storing the measurements of the position of the sonar, for example in a third memory 73, which may optionally be the first memory and/or the second memory.

The method also comprises a step 120, 121, 122 of forming the beams of the synthetic antennae from measurements of backscattered signals acquired by the first receiving antenna 3 over R successive pings of the sonar 1. The method also comprises a step 130, 131, 132 of forming synthetic images 11, 12, 13 from the beams of the respective synthetic antennae in respective steps 130, 131, 132.

In the case of a mono-aspect sonar, the step 102 is not implemented, the step 120, 121, 122 is a step of forming the beam of one synthetic antenna and step 130, 131, 132 is a step of forming the associated synthetic image.

The invention relates to a method comprising a step 120, 121, 122 of forming, over R pings and for each corresponding synthetic antenna of the sonar in question, beams from measurements of signals backscattered by the observed zone and generated by the acoustic pulses emitted in each section in question. In this step, variations in the movement of the first receiving antenna during the formation of the beams of the synthetic antennae are corrected for as explained above. According to the invention, during the formation of the beams of at least one synthetic antenna, estimations of elevation angles of backscattered signals are used, these estimations being obtained from a bathymetric chart comprising the three-dimensional positions of a plurality of points of the observed zone.

We will now describe the other steps of the method according to the invention in the case of a multi-aspect sonar in which the beams of the synthetic antennae corresponding to the second and third sectors are constructed from a bathymetric chart obtained from measurements of first elevation angles, which measurements are obtained by means of the array 11 of transducers.

The invention relates to a method for forming beams of corresponding synthetic antennae in step 120, 121, 122. The step 120, 121, 122 of forming the beams of the synthetic antennae over R successive pings comprises, a step 120 of forming the beams of the first synthetic antenna from measurements of first backscattered signals generated in the first sector S1 and steps 121, 122 of forming beams of two other synthetic antennae from second measurements of second and respectively third backscattered signals generated by acoustic pulses emitted in the second and respectively third sector, in which steps variations in the movement of the first receiving antenna are corrected for by carrying out an autocalibration by intercorrelation of the successive pings using measurements of rotation of the receiving antenna, which measurements are obtained by means of said at least one gyrometer, and using, to determine second and third image planes, estimations of second and respectively third elevation angles of backscattered signals calculated from a bathymetric chart. The rotation measurements are then projected onto the second and third image planes and used to carry out the autocalibration associated with the second and respectively third synthetic antenna. The bathymetric chart is for example obtained from the measurements of the first elevation angles. Steps 120 to 122 are carried out by the second module 41. The steps 120, 121, 122 are preceded by a distinguishing step, carried out by means of the first module 40, for distinguishing between the measurements of the signals depending on the acoustic-pulse sector in which they were generated. Each step 120, 121, 122 comprises a step (not shown) of selecting the signals required to form the beams of the synthetic antenna in question from the signals measured by the first physical antenna 3.

The method also comprises, prior to steps 120, 121, 122, a step 108, carried out for each ping, of measuring first elevation angles of first signals backscattered at a number P of probe times tp, where p=1 to P, which times are spaced apart pairwise by a predefined elementary period T starting at a first probe time t1 subsequent to the time of emission of the associated acoustic pulse and spaced apart from the latter by a predefined duration D. In other words, in each ping, first elevation angles of first signals backscattered by P probe points Pp, which signals are measured by the first receiving antenna 3, are measured at P probe times tp. These measurements are carried out in the reference frame of the array 11 by the array 11. In the case in FIG. 3, the first elevation angles are estimated on the basis of first measurements of first backscattered signals, which measurements are performed by the first elementary antenna 5, and on the basis of additional measurements of the first backscattered signals, which measurements are carried out by the second receiving antenna 12, in one ping.

The step 120 of forming beams of the first synthetic antenna is carried out on the basis of first measurements of first backscattered signals generated by pulses emitted in the first sector during the R pings. The first measurements are carried out, in the embodiment shown in the figures, by means of the first elementary receiving antenna 5. In this step, variations in the movement of the receiving antenna are corrected for by carrying out an autocalibration by intercorrelation of the successive pings. To correct for these variations, measurements of the rotations of the receiving antenna, which are obtained with said at least one gyrometer, are used and the estimations of the first elevation angles of the first backscattered signals generated by the acoustic pulses emitted in the first sector S1 are used to determine the first image planes onto which the rotation measurements obtained by means of the gyrometer must be projected to obtain the projections that are used to carry out the autocalibration of the first synthetic antenna. The estimations of the first elevation angles correspond to the measurements of the first elevation angles carried out by the array of transducers 11 and transposed, in step 110, to the terrestrial reference frame on the basis of the measurements of position and rotations of the sonar carried out in steps 104 and 106. This method makes it possible to obtain, for the first synthetic antenna, beams having a very high resolution identical to the beams of a conventional synthetic antenna the variations in the movement of the physical antenna of which are corrected for by means of the method described in patent application FR 2769372.

The method comprises a step 111a of producing, from the estimations of the first elevation angles, which estimations are obtained during the R pings, the bathymetric chart of the observed zone, and a step 111b of storing the bathymetric chart, for example in a fourth memory 74. The bathymetric chart comprises a set of three-dimensional positions of probe points Pp in the terrestrial reference frame.

Figure 6:
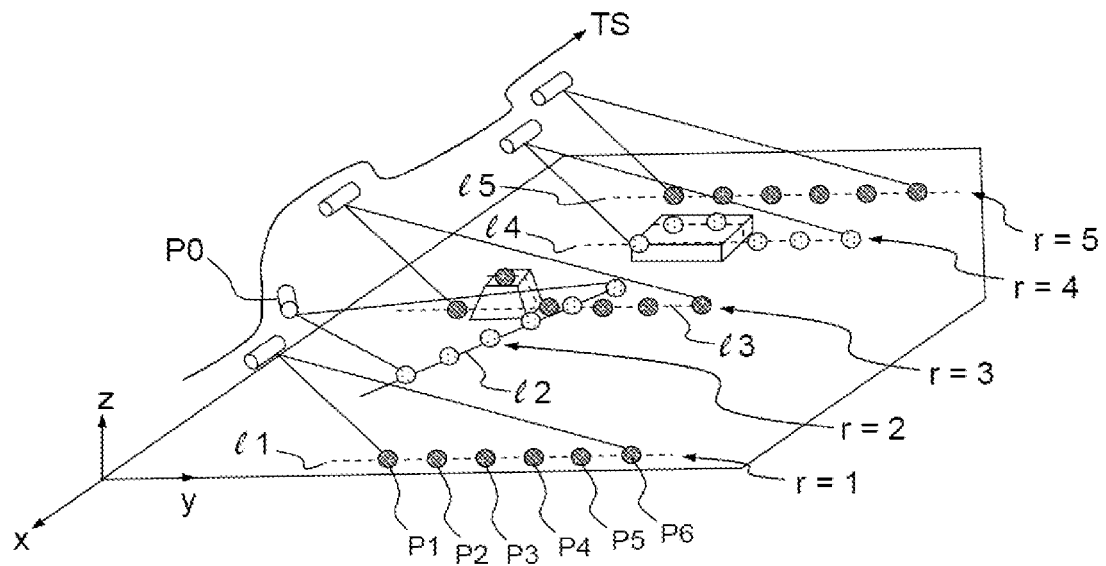
FIG. 6 schematically shows the construction of the bathymetric chart.

Step 111 consists, for each ping, in positioning, in a terrestrial reference frame, the probe points that caused the first backscattered signals measured for the ping in question, this positioning being carried out on the basis of the measurements of the first elevation angles carried out in step 108 and on the basis of the measurements of measured positions and rotation carried out in steps 104, 106, or indeed on the basis of the estimations obtained in step 110 of the first elevation angles in the terrestrial reference frame. FIG. 6 shows with circles the positions on each ping of the probe points Pp, where p=1 to 6, in a terrestrial reference frame x, y, z, the path TS of the carrier PO and the positions of the carrier PO on each ping r (r=1 to 5). For greater clarity, the circles associated with even pings are colored white and the circles associated with uneven pings are colored gray. For each ping, the limits of the first sector S1 in the vertical plane y, z containing the first sighting axis v1 have been represented by solid lines and the line Ir (where I=1 to 5) contained in this plane and passing through the probe points Pp obtained for said ping has been represented by a dotted line. The dotted lines Ir corresponding to the various pings are not parallel to one another because the path of the carrier is not exactly rectilinear. The three-dimensional mesh formed by the probe points is not necessarily regular in the x, y plane because of rotations and/or changes of speed of the carrier. For greater clarity, the positions of the probe points Pp have only been referenced for the first ping.

The method comprises a step 112 of estimating, for each ping, second elevation angles of second backscattered signals measured by the second elementary antenna 6 at P probe times tp, where p=1 to P, which times are spaced apart pairwise by a predefined elementary period T starting at a first probe time t1 subsequent to the time of emission of the corresponding second acoustic pulse and separated from the latter by the duration D. It also comprises a step 113 of estimating third elevation angles of third backscattered signals measured by the second elementary antenna 6 at P probe times tp, where p=1 to P, which times are spaced apart pairwise by a predefined elementary period T starting at a first probe time t1 subsequent to the time of emission of the corresponding third acoustic pulse and separated from the latter by the duration D. These steps are carried out on the basis of the bathymetric chart and of the measurements of position and attitude of the carrier during the R pings, which measurements are carried out in steps 104 and 106 of the corresponding ping. Steps 121 and 122 respectively use the estimations of the second and third elevation angles to improve the precision of the measurement of the rotations, which measurement is obtained by the gyrometer.

We will now describe the step 112 of estimating second elevation angles. The step 113 of estimating third elevation angles is carried out in the same way, but on the basis of the backscattered signals generated in the third sector S3. It will not be precisely described. The step 112 comprises, for each ping and for each probe time tp, a step 112p of estimating the second elevation angle of a second backscattered signal of an acoustic pulse emitted in the second sector S2 and measured by the first receiving antenna 3 at the probe time tp. This step 112p comprises:

a step 112a of calculating the position of that point Mp of the bathymetric chart which is closest to the position of the probe point Pp that generated the second backscattered signal by determining the position of that point of the bathymetric chart which is closest to the section of a circle Cp that is obtained by rotating a point B located at a distance $\rho_p$ from the center O of the receiving antenna 3 along the second sighting axis v2 about the first axis X1, the distance $\rho_p$ being the distance by which the probe point Pp needs to be separated from the center O of the first receiving antenna 3 for the first receiving antenna to measure the second signal backscattered by the probe point Pp at the probe time tp;

a step 112b of calculating a point of intersection Ip between the bathymetric chart and the section of the circle Cp on the basis of the point Mp, the point Ip corresponding to the estimated position of the probe point that backscattered the second signal;

a step 112c of calculating the elevation angle of the point Ip, in the terrestrial reference frame, on the basis of the position of Ip, on the basis of the measurement of the position of the carrier Po or of the receiving antenna 3 and especially its altitude with respect to the seabed and on the basis of the distance $\rho_p$.

Figure 7:
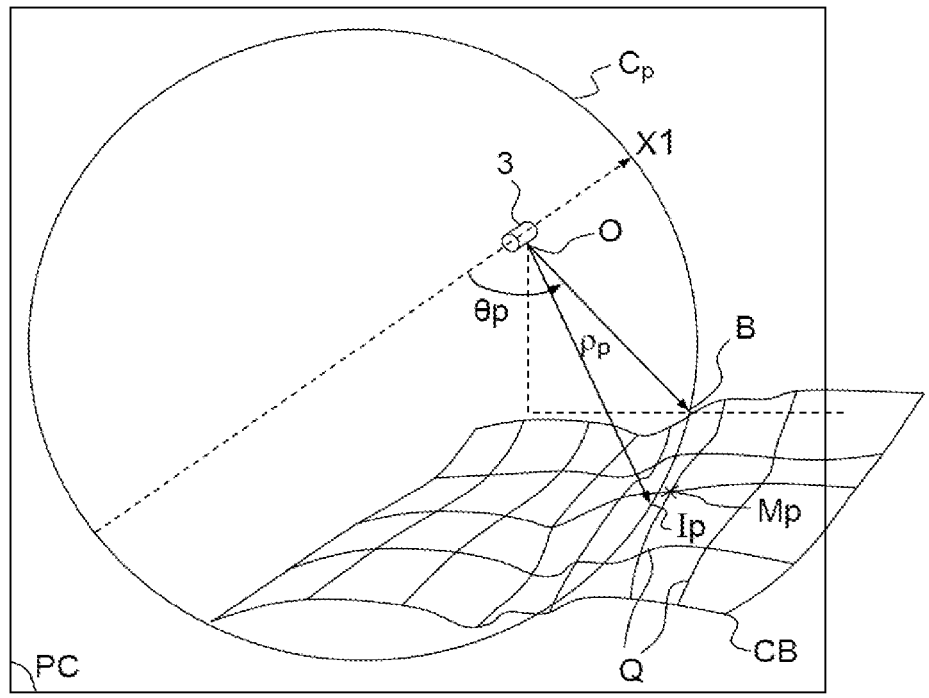
FIG. 7 schematically shows the calculation of the position of probe points for the second elevation angle.

The circle Cp is located in a plane PC perpendicular to the axis X1. FIG. 7 shows the circle Cp containing the points located at a distance $\rho_p$ from the center O of the antenna and having a bearing angle θp of 55°, the closest point Mp and the intersection Ip between Cp and the bathymetric chart CB. The known points of the bathymetric chart CB are the points of intersection of the grid Q. The used section of the circle is that section of the circle which is located starboard-side but the entirety of the circle Cp could also be used. The circle Cp is an estimation of the location of possible positions of the probe point Pp that caused the second backscattered signal. It is a question of all the points on a cone the axis of which is the axis X1 and the generatrice of which has a bearing angle equal to that of the second sighting axis v2, and which are located in the plane PC. In other words, this amounts to estimating, in the step 112, second elevation angles of second backscattered signals generated by acoustic pulses emitted along the second sighting axis v2, θ2 and located at the distance $\rho_p$ from the center of the receiving antenna 3.

The bathymetric chart must be stored in memory over the minimum number Nm of pings that allows the Pp probe points of the current ping to be positioned in the step of estimating third elevation angles (i.e. in the step of estimating elevation angles for the rearward mode). This number is the number of pings required when the average rotation of the sonar over its path is zero and it advances at the minimum speed $V_{min}$ (least favorable case):

$$N_m = \left\lceil 1 + \frac{\rho_{max}\sin(|\theta_S|)}{V_{min} \cdot Tr} \right\rceil$$

$\rho_{max}$ is the maximum range of the sonar (it is a maximum distance with respect to the center of the antenna referred to as the oblique distance) and $\theta_S$ is the relative bearing angle between the first sighting axis v1 and the rearward sighting axis v3. Tr is the time interval between two successive pings. Once the bathymetric chart has been produced for Nm pings, the estimation of elevation angles for the current ping for the rearward mode and the formation of the beam of the third synthetic antenna for the current ping, which is carried out using these elevation angles, may start. For the forward mode (formation of the beams of the second synthetic antenna), the calculation of the elevation angles cannot start immediately because the zone observed by the sonar along the second sighting axis v2 is located in front of the zone explored in side-scan mode (along v1). All the measurements of position, of rotation and of the backscattered signals must be kept in memory over Nm pings until the bathymetric chart corresponding to the zone sighted by the second axis v2 in the current ping has been constructed.

Advantageously, step 112 comprises, for each ping and for each time tp of order higher than 1, before the step 112a, a step (not shown) of extracting a section of the bathymetric chart that is smaller than the bathymetric chart, steps 112a and 112b then being carried out on the basis of the section of the bathymetric chart. This step makes it possible to accelerate the processing time. In one nonlimiting example, the entire bathymetric chart is used for tp when p=1 and then, for times tp of higher orders, a section of the bathymetric chart which is located at a horizontal distance below a preset threshold from the point of intersection obtained at the time of lower order is used.

Step 112a is carried out by calculating the distance between each point of the bathymetric chart (or of the bathymetric subchart) and the circle (or circular arc). Thus, the point Mp that is that point of the bathymetric chart which is closest to the section in question of the circle Cp is obtained. Step 112b is for example carried out by calculating the point of intersection Ip between a horizontal plane (parallel to the plane (x,y)) passing through the point Mp and the section of the circle Cp. This amounts to approximating the bathymetric chart by a horizontal plane in the vicinity of Mp. This step could be carried out more precisely using a plurality of points of the bathymetric chart to estimate the surface formed by the bathymetric chart in the vicinity of Mp.

In a first embodiment, the estimation of the second elevation angle is the angle calculated in step 112c.

In one variant (not shown), step 112 comprises the step 112a of calculating a first point Mp, a first step 112b of calculating a first point of intersection Ip, and a first step 112c of calculating a first elevation angle, in which steps the point Ip is calculated from the horizontal plane passing through the point M. Step 112 also comprises a second step 112b of calculating a second point of intersection, in which step a second point of intersection between a second section of the circle Cp and a surface formed from the point M and other points of the bathymetric chart is sought in order to improve the precision of the positioning of the point Ip, and, if this step converges, a second step of calculating the elevation angle, in the terrestrial reference frame, of the second point of intersection. The second elevation angle is then the elevation angle calculated for the second point of intersection. This method allows more precise estimations of elevation angles to be obtained.

Advantageously, the steps 112p are carried out for each time tp starting at a start time and while scanning the times in increasing order until a last time (p=P) and while scanning the times, from the time preceding the start time, in decreasing order to the first time (p=1), the start time being different from the first time and the last time. This method makes it possible to increase robustness.

Another subject of the invention is a computer program product comprising programming code instructions for executing the steps of the method according to the invention when the program is run on a computer.

The steps of the described process may be implemented by means of one or more programmable processors that run a computer program in order to perform the functions of the invention by operating on input data (especially the backscattered signals, the gyrometer data and the bathymetric chart) and generating output data (synthetic aperture beams). A computer program may be written in any form of programming language, including compiled or interpreted program languages and the computer program may be deployed in any form including as an autonomous program or a subroutine, a component or another unit usable in a programmable environment. A computer program may be deployed to be run on one computer, or on a plurality of computers on one site or distributed over a plurality of sites and interconnected by a communication network.

The invention claimed is:

1. A method for forming synthetic aperture beams of a sonar over R pings of the sonar, the sonar being intended to move along a first axis, the sonar comprising an emitting device configured to emit, in each ping of successive pings, at least one acoustic pulse toward an observed zone in a set of sectors, a first physical receiving antenna extending along the first axis allowing measurements of backscattered signals generated by said at least one acoustic pulse and backscattered by the observed zone; a processing device configured to form, over R pings, for each sector of the set of sectors, synthetic aperture beams from measurements of signals backscattered by the observed zone and generated by acoustic pulses emitted in said sector, and at least one gyrometer that obtains rotation measurements of the first receiving antenna, the method comprising:

forming, for each sector over R pings, synthetic aperture beams from measurements of signals backscattered by the observed zone and generated by acoustic pulses emitted in said sector, wherein variations in the movement of the first receiving antenna during the formation of the synthetic aperture beams of said set of sectors are corrected for by carrying out an autocalibration by intercorrelation of the successive pings using rotation measurements of the first receiving antenna, which measurements are obtained with said at least one gyrometer, and using estimations of the elevation angles of the backscattered signals to determine image planes of the backscattered signals; and to project said rotation measurements onto said image planes, the projections obtained being used to carry out the autocalibration, and wherein, during the forming of the synthetic aperture beams of the first sector and of a second sector of the set of sectors, estimations of elevation angles are obtained from a bathymetric chart comprising the three-dimensional positions, defined in a terrestrial reference frame having three axes fixed to the earth, of a plurality of points of the observed zone, the emitting device being configured to emit, in each ping, in the first sector and in the second sector, distinguishable acoustic pulses toward an observed zone, along a first sighting axis and a second sighting axis having different bearing angles, respectively, and the bathymetric chart being obtained from measurements of first elevation angles of first backscattered signals generated by acoustic pulses emitted in said first sector, the sonar comprising an array of transducers comprising a plurality of elementary transducers distributed along a second axis perpendicular to the first axis, said transducers forming the array of transducers being dimensioned and configured so that their receiving lobes cover the first sector but so that said at least one second sector is located at least partially beyond their receiving lobes, the first backscattered signals being acquired by means of the array of transducers, the method comprising, for each ping, measuring first elevation angles of first backscattered signals by means of the array of transducers, calculating estimations of first elevation angles, consisting in transposing the measurements of first elevation angles to the terrestrial reference frame, the method comprising producing the bathymetric chart from the estimations of the first elevation angles, the bathymetric chart comprising three-dimensional coordinates, in the terrestrial reference frame, of probe points having backscattered the first backscattered signals, the method comprising estimating, from the bathymetric chart, the elevation angles of the backscattered signals generated by pulses emitted in the first sector and in the second sector, comprising, for each of the backscattered signals, calculating the position of that point Mp of the bathymetric chart which is closest to a section of a circle Cp obtained by rotating, about the first axis, a point B located on the other sighting axis at a distance from the antenna corresponding to the distance separating the antenna from a probe point having generated the backscattered signal, calculating a first point of intersection Ip between the bathymetric chart and the section of the circle Cp on the basis of the closest point Mp, and calculating, in the terrestrial reference frame, the elevation angle of the point of intersection.

2. The method of claim 1, wherein the point of intersection Ip is the point of intersection between a horizontal plane, in the terrestrial reference frame, passing through the closest point Mp, and the section of the circle Cp.

3. The method of claim 1, comprising calculating a second point of intersection Ip between the bathymetric chart and the section of the circle Cp on the basis of the closest point Mp and other points of the bathymetric chart, and, if a second point of intersection is obtained, calculating the elevation angle of the second point of intersection.

4. The method of claim 1, wherein the physical receiving antenna comprises a first elementary physical antenna formed from first transducers dimensioned and configured so that their receiving lobes cover the first sector but so that said at least one second sector is at least partially located beyond their receiving lobes, the forming beams comprising forming beams of a first synthetic antenna from measurements of backscattered signals generated by pulses emitted in said first sector and acquired by means of the first elementary antenna, wherein the estimations of backscattered signal elevation angles used to determine the image planes of the backscattered signals and to project said rotation measurements onto said image planes are estimations of first elevation angles of the first backscattered signals, the first backscattered signals being generated by pulses emitted in said first sector, the estimations of the first elevation angles being transpositions of the measurements of the first elevation angles into the terrestrial reference frame.

5. A non-transitory computer readable medium comprising instructions that when executed by a computer cause the computer to automatically perform the method of claim 1.

* * * * *